United States Patent
Wehner et al.

[11] Patent Number: 6,114,671
[45] Date of Patent: Sep. 5, 2000

[54] SYSTEM FOR AND METHOD OF CONTROLLING THE TEMPERATURE OF AN OBJECT USING TEMPERATURE CONTROL ELEMENTS SPACED FROM THE OBJECT

[75] Inventors: James W. Wehner, Torrance; Michael J. Wehner, Hawthorne; Bruce D. Marcus, Los Angeles; John A. Pohner, Hawthorne, all of Calif.

[73] Assignee: TRW Inc., Redondo Beach, Calif.

[21] Appl. No.: 09/358,865

[22] Filed: Jul. 22, 1999

[51] Int. Cl.$^7$ ....................................................... H05B 1/02
[52] U.S. Cl. .......................... 219/497; 219/483; 219/486; 219/505; 219/494; 307/117
[58] Field of Search .......................... 219/501, 483–486, 219/497, 505, 494, 388, 216; 392/416; 307/117

[56] References Cited

U.S. PATENT DOCUMENTS

| | | | |
|---|---|---|---|
| 3,956,612 | 5/1976 | Ballard et al. | 219/358 |
| 4,560,431 | 12/1985 | Inselmann | 219/486 |
| 5,258,601 | 11/1993 | Takano | 219/486 |
| 5,900,177 | 5/1999 | Lecouras et al. | 219/497 |

OTHER PUBLICATIONS

"Telescope Thermal Design" and "Main Tube Thermal Control" from pp. A96 through A–99, including pp. A98a and A98b, from *Orbiting Solar Laboratory (OSL)Best and Final Offer*, prepared for NASA by TRW Federal Systems Division, Space & Technology Group (Sep. 14, 1990).

*Primary Examiner*—Mark Paschall
*Attorney, Agent, or Firm*—Michael S. Yatsko

[57] ABSTRACT

A system for and a method of controlling the temperature of an object (22). Temperature sensors (30) are placed on the object (22) in abutting zones (24) substantially covering a surface of the object (22), so as to detect a temperature in each of the respective zones (24). Temperature adjusting elements (28) are spaced from and thermally coupled to the object (22), to adjust the temperatures of corresponding ones of the respective zones (24). Temperature control circuits (32, 34, 36), responsive to temperatures detected by respective ones of the temperature sensors (30), control the corresponding ones of the temperature adjusting elements (28) to maintain the temperatures of the respective zones (24) within a preset temperature range. When the object (22) is in a cold environment and is to be maintained at a warmer temperature, the temperature adjusting elements (28) are heating elements. Conversely, when the object (22) is in a warm environment and is to be cooled, the temperature adjusting elements (28) are cooling elements. In a preferred embodiment, the number of zones (24) and temperature sensors (30) is equal to the number of temperature adjusting elements (28).

19 Claims, 2 Drawing Sheets

SYSTEM FOR AND METHOD OF CONTROLLING THE TEMPERATURE OF AN OBJECT USING TEMPERATURE CONTROL ELEMENTS SPACED FROM THE OBJECT

FIELD OF THE INVENTION

The present invention pertains to a system for and a method of controlling the temperature of an object, which could be a small device or a large structure. An exemplary embodiment of the present invention pertains to a system for and a method of controlling the temperature of a large structure to maintain a substantially uniform temperature over the entire structure so as to avoid changes in alignment of the structure due to temperature variations, but the invention is likewise applicable to controlling the temperature of a small device, including controlling the temperature during manufacture of the device. The present invention will be described in detail herein with reference to an optical system including such a temperature control system, but is equally usable in other applications.

BACKGROUND OF THE INVENTION

Precision dimensional structures, for example optical structures such as space telescopes, require accurate temperature control in order to minimize distortion resulting from uneven thermal expansion. Such distortion might cause optical aberrations such as defocusing. Very precise optical structures can require temperature stability beyond the capability of modem heater circuits to control or even to measure.

Previously, such precision optical structures have been constructed from a material having a low rate of thermal expansion such as Invar or graphite so as to minimize the effects of temperature differences over the structure. However, such materials are heavy and expensive. Moisture absorption in graphite outgasses during orbiting in space, presenting the danger of contamination. In addition, significant temperature differences can result in some amount of distortion even with low thermal expansion material.

A proposal in the past to avoid distortion of structures in warm-biased environments, from which heat flows out, was to use a material having high thermal conductivity, such as aluminum, and to control the temperature of the structure by dividing the surface of the structure into a large number of contiguous zones, affixing a heater element onto each zone of the structure, sensing the temperature in each zone of the structure, and controlling a proportional controller to control the respective heater elements based on the sensed temperatures in the corresponding zones. Such a system and method, however, have shortcomings. Placement of the heater elements directly on the zones of the structure limits the influence which each heater element can have on adjacent zones and on the overall structure. This can be of particular concern if a temperature sensor/heater element combination should fail, making it necessary for adjacent heater elements to maintain the heat in the zone of the failed components. In addition, very accurate temperature sensors are required for the proportional heater controllers. Errors might arise due to errors in temperature measurement, errors in the proportional temperature controllers, or errors due to the locations of the temperature sensors in that the temperature in the location on a zone at which the temperature is sensed may not be the same as the average temperature of the zone.

SUMMARY OF THE INVENTION

The present invention is a system for and a method of controlling the temperature of an object to maintain a substantially uniform temperature over the entire object. In accordance with the present invention, a surface on the object is divided into a plurality of abutting zones which substantially cover the surface. A temperature sensor is provided in each zone. A plurality of temperature adjusting elements are spaced from and thermally coupled to the zones on the object surface. The thermal coupling might be radiative, convective or conductive. The temperature in each zone is sensed and applied to a controller which also receives a temperature set point signal. The controller, which preferably is an on/off switch, controls the corresponding temperature adjusting element so as to maintain the sensed temperature substantially equal to the temperature indicated by the set point signal. The system and method can provide specific temperature control by having the set point signal maintain the object at a specific temperature, or can provide relative temperature control by having the set point signal maintain a uniform temperature over the entire object without regard to the specific temperature of the object. Either technique assures that the object does not warp, distort, or otherwise change its shape or alignment due to differences in thermal expansion or contraction brought about by temperature differences over the object. To control an object in a cold environment, for example a space telescope, the temperature adjusting elements may be heaters. To control an object in a warm environment, the temperature adjusting elements may cooling elements.

The use of a large number of zones provides the advantage of statistically averaging the temperature errors. If the temperature adjusting elements have an average error of $\pm E°$ Celsius and N zones are sensed on the structure surface, then, ignoring possible crosscoupling between adjacent zones, the average temperature deviation for the whole structure is $[|E| \div \sqrt{N}]°$ Celsius. Thus, if, for example, the structure surface is divided into 100 zones, and each temperature adjusting element can maintain the temperature to within $\pm 0.1°$ Celsius, then the average temperature of the structure will have an error of not more than $\pm 0.01°$ Celsius. The utilization of a large number of zones is further advantageous since if a temperature adjusting element fails to operate, the surrounding temperature adjusting elements compensate, particular where the structure is formed of a high thermal conductivity material such as aluminum.

BRIEF DESCRIPTION OF THE DRAWINGS

These and other aspects and advantages of the present invention are more apparent in the following detailed description and claims, particularly when considered the conjunction with the accompanying drawings. In the drawings:

DETAILED DESCRIPTION

Figure 1:
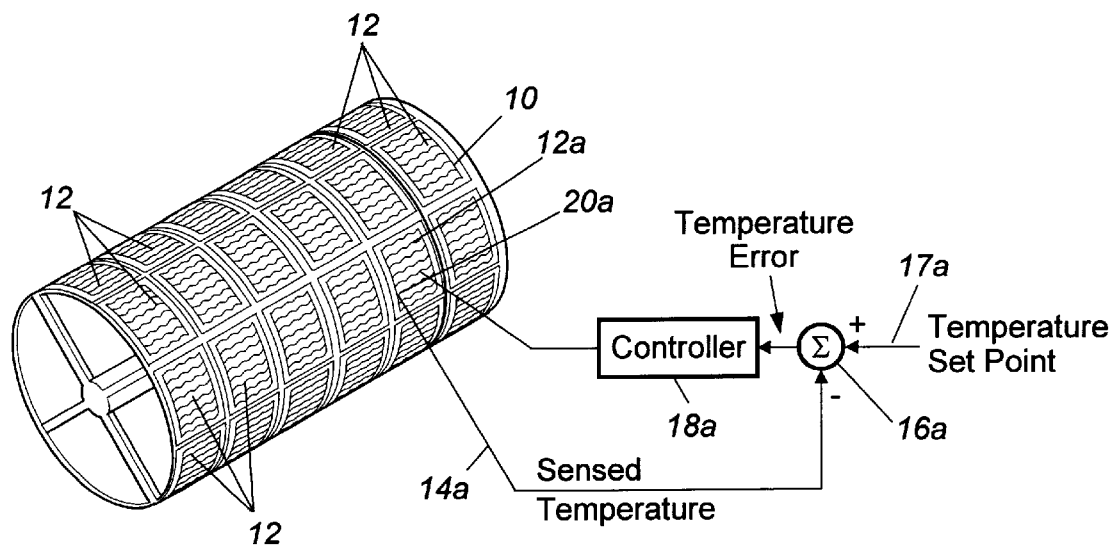
FIG. 1 is a schematic diagram illustrating a prior art system for and method of controlling the temperature of an object.

FIG. 1 illustrates a prior art system for and method of controlling the temperature of an object, which is depicted as a structure in the form of a space telescope 10. The outer peripheral surface of space telescope 10 is divided into a large number of contiguous zones 12. A temperature sensor 14a senses the temperatures of zone 12a and provides a signal indicative of the temperature sensed in the zone 12a to a comparison or summing circuit 16a. Comparison circuit 16a also receives a temperature set point signal on input line 17a, indicative of a desired temperature for the zone 12a. The output of comparison circuit 16a is applied to a controller 18a which controls a heating element 20a on the zone 12a. A similar temperature sensor 14, comparison circuit 16, input line 17, controller 18, and heating element 20 are provided for each zone 12 on the surface of space telescope 10; however only a single set of these components is illustrated in FIG. 1 for clarity.

Figure 2:
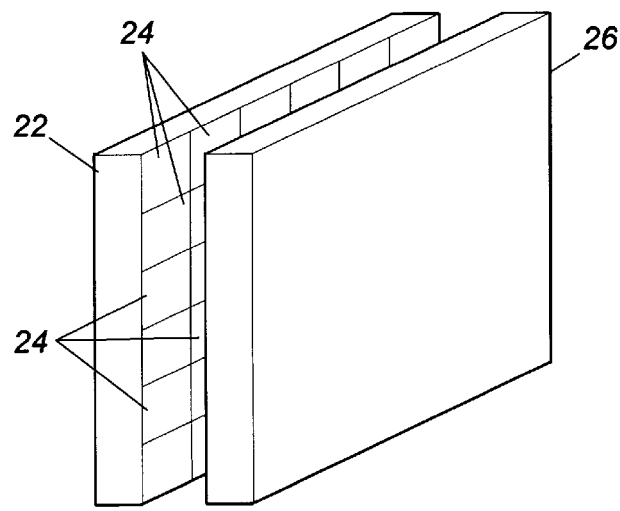
FIG. 2 is a schematic diagram illustrating a system for and a method of controlling the temperature of an object in accordance with a preferred embodiment of the present invention.
Figure 3:
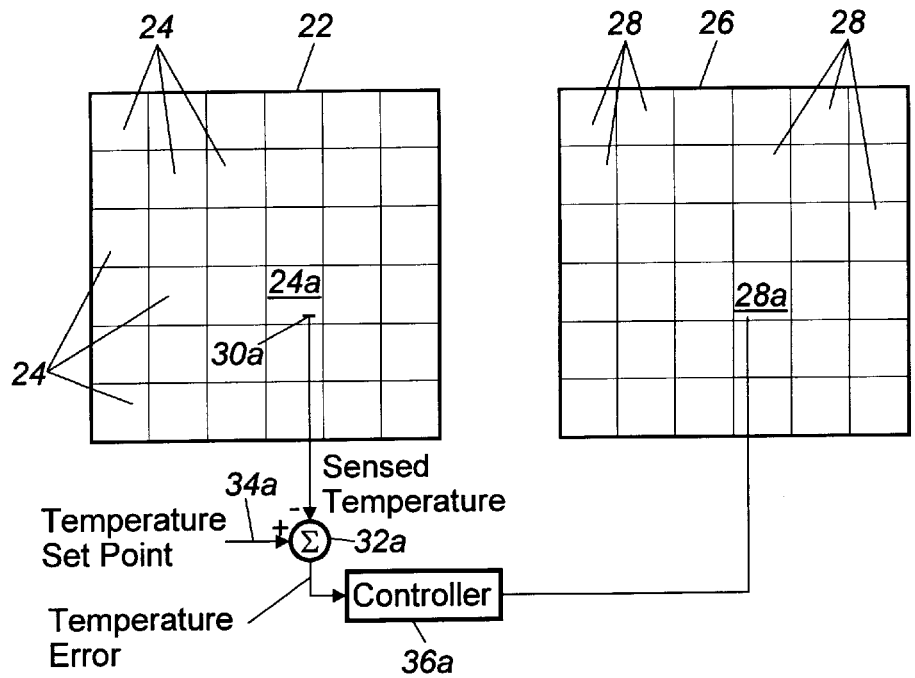
FIG. 3 is another schematic diagram of the system of FIG. 2 and is useful in explaining the system and method of the present invention.

FIG. 2 illustrates controlling of the temperature of an object which is illustrated as a structure 22, in accordance with a preferred embodiment of the present invention using a heat source 26. FIG. 3 illustrates the structure 22 and the heat source 26 turned to show their respective facing surfaces. The facing surface of structure 22 is divided into an array of contiguous zones 24, and heat source 26 includes an array of heating elements 28 which are spaced from and face the zones 24. In the illustrated embodiment there is correspondence between the respective zones 24 and the respective heating elements 28, with each zone 24 having a corresponding heating element 28 to control the temperature of that zone. Thus, for example, the temperature sensor of zone 24a in structure 22 provides the signal that is used in controlling the heating element 28a to adjust the temperature of zone 24a. The heating elements 28 are spaced from the surface of structure 22. Heat from each heating element 28 is transferred to the corresponding zone 24, for example by radiation, convection, or conduction. In many applications, radiation or convection are preferred since these methods do not require contact with the surface of the zone 24.

A temperature sensor 30a senses the temperature of zone 24a and provides a signal indicative of the temperature of zone 24a to a comparison or summing circuit 32a. Comparison circuit 32a also receives a temperature set point signal on an input 34a indicative of a desired temperature for the zone 24a. Comparison circuit 32a compares the temperature sensed by temperature sensor 30a with the temperature indicated by the temperature set point signal and provides a controller 36a with a signal indicative of the difference between the two, or the temperature error. Based on this temperature difference signal, controller 36a controls heater 28a which is opposite zone 24a. A similar temperature sensor 30, comparison circuit 32, input line 34, and controller 36 is provided for each set of zones 24 and heat sources 28, but only a single set of these components is depicted in the drawings for clarity. Thus, the respective zones 24 are maintained substantially at the desired temperature so as to maintain the overall average temperature of structure 22 at the desired level.

Figure 4:
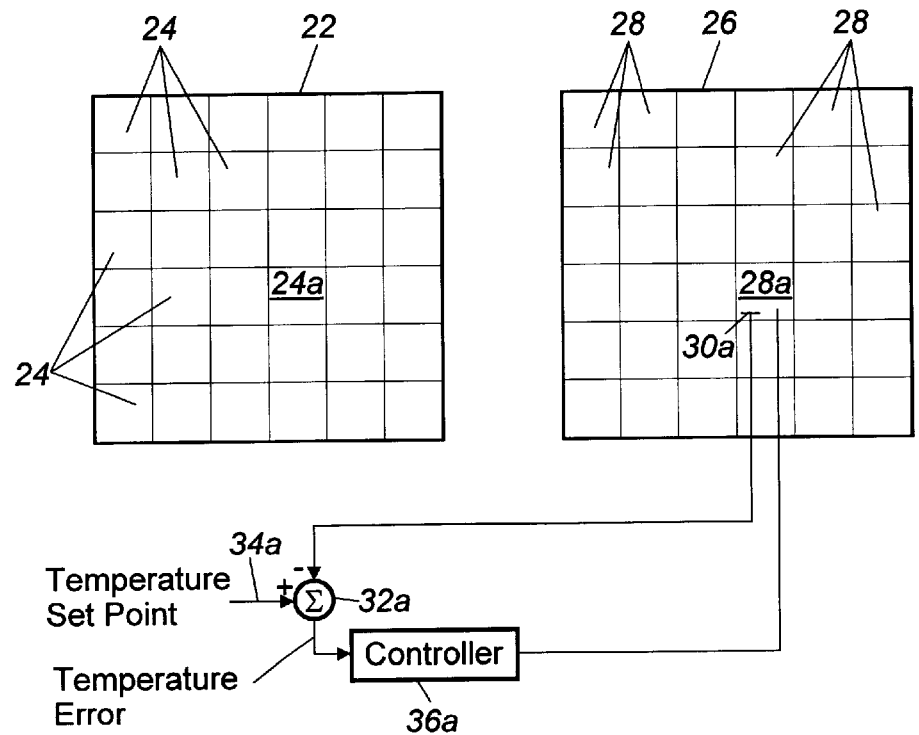
FIG. 4 is a schematic diagram illustrating a system for and method of controlling the temperature of an object in accordance with another embodiment of the present invention.

The heating elements 28 are thus spaced from the zones 24 and their temperature sensors 30, and the heat from the heating elements 28 may be radiatively coupled to the respective zones 24. Alternatively, the heat from the spaced heat sources might be transferred to the zones of the object by convection or by conduction. In addition, instead of sensing the temperature of the zones 24 and using that to control the heating elements 28, the temperature of the heating elements themselves might be sensed and used to control the heating elements, as depicted in FIG. 4. This avoids mounting the temperature sensors on the surfaces of the zones 24. Such avoidance may be advantageous since those surfaces may be contamination sensitive. In addition, the placement of the temperature sensors on the surfaces of zones 24 may distort the temperature reading by distorting localized heating/cooling coefficients due to the sensor contact. Further, sensing of the temperature of the heating elements 30, rather than of the zones 24, may improve temperature stability.

The temperature of each zone 24 is controlled primarily by its corresponding heating element 28. However, some amount of cross-coupling can occur, and is controllable, depending upon the particular application. Such cross-coupling can be advantageous, in that it permits temperature control with fewer zones, and correspondingly fewer heating elements. Each zone 24 is coupled to multiple adjacent heating elements. Of course, the more remote heating elements have less effect on the temperature of any given zone. However, should one of the heating element/temperature sensor combinations become inoperative, the temperature within the associated zone will be controlled by the adjacent heating elements. In addition, all of the heating elements may be totally decoupled conductively from one another, and cross coupling may still take place, which improves stability.

By means of the present invention, the average temperature of the structure 22 can be maintained at the desired uniform level with a smaller number of zones 24, and a correspondingly smaller number of heating elements 28 than are required in the prior art system of FIG. 1. The remote nature of the heating elements 28 reduces the potential for contamination. This cross coupling of the heat from adjacent elements results in the temperature of structure 22 being more stable. In addition, the use of on/off switches for the heating elements to act as the controllers 36, rather than the proportional controllers utilized in the prior art system of FIG. 1, simplifies implementation. Further, satisfactory control of the overall average temperature of structure 22 can be achieved with less accurate temperature sensors than in the prior art.

FIGS. 2 and 3 illustrate structure 22 and array 26 as substantially planar. However, structure 22 might be any type of object including both small objects and large objects, including for example, an optical telescope such as the optical telescope 10 of FIG. 1, so long as the heating elements are spaced from the surface of the object. Further, the temperature set point can indicate a specific temperature at which the object is to be maintained, or alternatively can be an arbitrary temperature used simply to maintain a uniform temperature throughout object, without regard to a specific temperature.

FIGS. 2 and 3 illustrate a system having an equal number of zones 12 and heating elements 28. However, if a structural feature of structure 22 results in a cold spot at some location, an additional heating element can be provided to adjust the temperature of that cold spot. Further, there might be more heating elements 28 than zones 12. In either of these two situations, control of the additional heating elements can be based on the temperatures sensed in the adjacent zones 12. Likewise, a lesser number of heating elements 28 than the number of zones 12 might be provided, with the sensed temperatures of two or more zones being averaged to control certain ones, or all of the heating elements. Further, a zone 24 may have two or more temperature sensors 30, with their sensed temperatures being averaged to control a single heating element. The zones 24 need not be of the uniform size.

The above description of the present invention has been with reference to an object that is warm-biased and from which heat naturally flows out, so that the object is to have its temperature increased by adding heat. Therefore, heating elements are utilized. If the object is cold-biased, and so naturally heat flows in, so that the object is to have its temperature maintained below the ambient temperature, then cooling elements are utilized, rather than heating elements. Thus, the type of temperature adjusting elements utilized is dependent upon the desired average temperature for the object as compared with the surrounding ambient temperature.

Although the present invention has been described with reference to a preferred embodiment, rearrangements, alterations, and substitutions could be made, and still the result will be within the scope of the invention.

What is claimed is:

1. A system for controlling the temperature of an object, the object having a surface substantially covered by a two-dimensional array of abutting, thermally cross-coupled zones, said system comprising:

a two-dimensional array of temperature sensors for sensing a temperature in each of the respective abutting zones;

a two-dimensional array of temperature adjusting elements adapted to be spaced from and thermally coupled to the object in a fixed spatial relationship to adjust the temperatures of corresponding ones of the respective zones; and a plurality of temperature control circuits responsive to temperatures detected by respective ones of said temperature sensors for individually controlling the corresponding ones of said temperature adjusting elements to maintain the temperatures of the respective zones within a preset common temperature range so as to maintain a substantially uniform temperature over the surface of the object.

2. A system as claimed in claim 1, wherein each of said temperature control circuits comprises a source of a temperature set point signal indicative of a particular temperature, a comparison circuit for comparing the temperature detected by a corresponding one of said temperature sensors with the particular temperature indicated by the temperature set point signal, and a temperature controller for controlling the corresponding one of said temperature adjusting elements based on the comparison results.

3. A system as claimed in claim 2, wherein each of said temperature controllers comprises an on/off switch for switching the corresponding one of said temperature adjusting elements on and off.

4. A system as claimed in claim 1, wherein the said two-dimensional array of temperature sensors has a first number of temperature sensors aligned in a first dimension and a second number of temperature sensors aligned in a second dimension and said two-dimensional array of temperature adjusting elements has said first number of temperature adjusting elements aligned in a first dimension and said second number of temperature adjusting elements aligned in a second dimension.

5. A system as claimed in claim 1, wherein each of said temperature adjusting elements comprises a heating element.

6. A system as claimed in claim 1, wherein said temperature adjusting elements are adapted to be radiatively coupled to the object.

7. A system as claimed in claim 1, wherein said temperature adjusting elements are adapted to be convectively coupled to the object.

8. A system as claimed in claim 1, wherein said temperature adjusting elements are adapted to be conductively coupled to the object.

9. A temperature control system comprising;

an object which is to have its temperature controlled, said object having a surface substantially covered by a two-dimensional array of abutting, thermally cross-coupled zones;

a two-dimensional array of temperature sensors mounted on the two-dimensional array on said object so as to detect a temperature in each of the respective zones;

a two-dimensional array of heating elements spaced from and thermally coupled to said object in a fixed spatial relationship to adjust the temperatures of corresponding ones of the respective zones; and a plurality of heating element control circuits responsive to temperatures detected by respective ones of said temperature sensors for individually controlling the corresponding ones of said heating elements to maintain the temperatures of the respective zones within a preset temperature range, so as to maintain the object at a desired overall temperature, and so maintaining a substantially uniform temperature over the surface of the subject.

10. A system as claimed in claim 9, wherein each of said heating element control circuits comprises a source of a temperature set point signal indicative of a particular temperature, a comparison circuit for comparing the temperature detected by a corresponding one of said temperature sensors with the particular temperature indicated by the temperature set point signal, and a temperature controller for controlling the corresponding one of said heating elements based on the comparison results.

11. A system as claimed in claim 10, wherein each of said temperature controllers comprises an on/off switch for switching the corresponding one of said heating elements on and off.

12. A system as claimed in claim 9, wherein said two-dimensional array of temperature sensors has a first number of temperature sensors aligned in a first dimension and a second number of temperature sensors aligned in a second dimension, and said two-dimentional array of temperature adjusting elements has said first number of temperature adjusting elements aligned in a first dimension and a said second number of temperature adjusting elements aligned in a second dimension.

13. A system as claimed in claim 9, wherein said object is a structure.

14. A system as claimed in claim 13, wherein said structure is an optical element.

15. A system as claimed in claim 9, wherein said heating elements are radiatively coupled to the object.

16. A system as claimed in claim 9, wherein said heating elements are convectively coupled to the object.

17. A system as claimed in claim 9, wherein said heating elements are conductively coupled to the object.

18. A method of controlling the temperature of an object, said method comprising the steps of:

(a) detecting a temperature in each zone of a two-dimensional array of abutting, thermally cross-coupled zones substantially covering a surface of the object; and (b) controlling a two-dimensional array of temperature adjusting elements spaced from and thermally coupled to the object in a fixed spatial relationship to maintain the temperatures of corresponding ones of the zones within a preset temperature range based on the temperatures detected in the corresponding ones of the zones so as to maintain a substantially uniform temperature over the surface of the object.

19. A method as claimed in claim 18, wherein step (b) comprises:

comparing the detected temperatures with a temperature indicated by a temperature set point signal; and controlling the temperature adjusting elements based on the comparison results.

* * * * *